United States Patent
Foret et al.

(10) Patent No.: US 11,836,635 B2
(45) Date of Patent: Dec. 5, 2023

(54) MUTABLE PARAMETERS FOR MACHINE LEARNING MODELS DURING RUNTIME

(71) Applicant: Apple Inc., Cupertino, CA (US)

(72) Inventors: Cecile M. Foret, Palo Alto, CA (US); Xiaozhong Yao, Cupertino, CA (US); Sundararaman Hariharasubramanian, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 827 days.

(21) Appl. No.: 16/601,504

(22) Filed: Oct. 14, 2019

(65) Prior Publication Data

US 2020/0380374 A1 Dec. 3, 2020

Related U.S. Application Data

(60) Provisional application No. 62/855,898, filed on May 31, 2019.

(51) Int. Cl.
*G06N 3/02* (2006.01)
*G06N 3/10* (2006.01)
(Continued)

(52) U.S. Cl.
CPC .............. *G06N 3/10* (2013.01); *G06F 8/41* (2013.01); *G06F 17/16* (2013.01)

(58) Field of Classification Search
CPC ........ G06N 3/10; G06N 3/0481; G06N 3/105; G06N 3/08; G06N 3/0454; G06F 8/41; G06F 17/16
See application file for complete search history.

(56) References Cited

U.S. PATENT DOCUMENTS 6,246,972 B1 6/2001 Klimasauskas
9,886,663 B2 2/2018 Sarah et al.
(Continued)

FOREIGN PATENT DOCUMENTS

CN 105808454 7/2016
CN 107491469 A 12/2017
(Continued)

OTHER PUBLICATIONS

Jin, et al., "Split-CNN: Splitting Window-based Operations in Convolutional Neural Networks for Memory System Optimization," Proceedings of the 24th International Conference on Architectural Support for Programming Languages and Operating Systems, Apr. 2019, pp. 835-847.
(Continued)

*Primary Examiner* — Tuan C Dao
(74) *Attorney, Agent, or Firm* — BAKERHOSTETLER

(57) ABSTRACT

The subject technology receives code corresponding to a neural network (NN) model and a set of weights for the NN model. The subject technology determines a set of layers that are mutable in the NN model. The subject technology determines information for mapping a second set of weights to the set of weights for the NN model. The subject technology generates metadata corresponding to the set of layers that are mutable, and the information for mapping the second set of weights to the set of weights for the NN model, wherein the generated metadata enables updating the set of layers that are mutable during execution of the NN model.

21 Claims, 8 Drawing Sheets

(51) Int. Cl.
*G06F 17/16* (2006.01)
*G06F 8/41* (2018.01)

(56) References Cited

U.S. PATENT DOCUMENTS

| | | | |
|---|---|---|---|
| 10,186,011 B2 | 1/2019 | Nurvitadhi et al. | |
| 10,467,795 B2 | 11/2019 | Sarel | |
| 11,023,803 B2 | 6/2021 | Kalamkar | |
| 2001/0034628 A1* | 10/2001 | Eder | G06Q 10/06 |
| | | | 705/7.29 |
| 2003/0110151 A1* | 6/2003 | Fortier | G06F 8/52 |
| 2005/0102657 A1 | 5/2005 | Lewi | |
| 2014/0136452 A1* | 5/2014 | Wellman | G06N 20/00 |
| | | | 706/12 |
| 2014/0372513 A1* | 12/2014 | Jones | G06F 9/5072 |
| | | | 709/203 |
| 2015/0286471 A1 | 10/2015 | Raz | |
| 2016/0267380 A1* | 9/2016 | Gemello | G06N 3/084 |
| 2016/0313991 A1 | 10/2016 | Wei | |
| 2017/0161604 A1 | 6/2017 | Craddock | |
| 2017/0330029 A1* | 11/2017 | Turcot | A61B 5/7267 |
| 2017/0364796 A1* | 12/2017 | Wiebe | A01D 5/00 |
| 2018/0053102 A1* | 2/2018 | Martinson | G08G 1/09623 |
| 2018/0088996 A1 | 3/2018 | Rossi | |
| 2018/0189642 A1* | 7/2018 | Boesch | G06N 3/0454 |
| 2018/0204117 A1 | 7/2018 | Brevdo | |
| 2018/0239992 A1 | 8/2018 | Chalfin et al. | |
| 2018/0247197 A1 | 8/2018 | Tucker et al. | |
| 2018/0277246 A1* | 9/2018 | Zhong | A61B 5/4833 |
| 2018/0293492 A1 | 10/2018 | Kalamkar | |
| 2018/0293777 A1 | 10/2018 | Sarel | |
| 2018/0322387 A1 | 11/2018 | Sridharan et al. | |
| 2019/0056885 A1 | 2/2019 | Mathuriya et al. | |
| 2019/0073590 A1 | 3/2019 | Wu | |
| 2019/0130268 A1* | 5/2019 | Shiring | G06N 3/0481 |
| 2019/0156185 A1 | 5/2019 | Li | |
| 2019/0156816 A1* | 5/2019 | Singh | G10L 15/18 |
| 2019/0164037 A1* | 5/2019 | Kim | G06N 3/0454 |
| 2019/0228284 A1* | 7/2019 | Holland | G06N 3/047 |
| 2019/0236486 A1* | 8/2019 | Azab | G06N 3/0445 |
| 2019/0279344 A1* | 9/2019 | Duggal | G06F 21/84 |
| 2019/0286973 A1 | 9/2019 | Kovvuri | |
| 2019/0318806 A1* | 10/2019 | Wise | G06N 3/0454 |
| 2019/0340492 A1* | 11/2019 | Burger | G06N 3/08 |
| 2019/0354708 A1* | 11/2019 | Fisher | G06F 16/212 |
| 2020/0042860 A1 | 2/2020 | Sun | |
| 2020/0379740 A1 | 12/2020 | Paek | |
| 2022/0172072 A1 | 6/2022 | Keller | |

FOREIGN PATENT DOCUMENTS

| | | |
|---|---|---|
| CN | 108229646 A | 6/2018 |
| CN | 108351805 A | 7/2018 |
| WO | WO 2018/058426 | 4/2018 |

OTHER PUBLICATIONS

Chinese Office Action from Chinese Patent Application No. 202010374389.1, dated Aug. 30, 2023, 11 pages including English language translation of Search Report.

* cited by examiner

MUTABLE PARAMETERS FOR MACHINE LEARNING MODELS DURING RUNTIME

CROSS-REFERENCE TO RELATED APPLICATIONS

The present application claims the benefit of U.S. Provisional Patent Application Ser. No. 62/855,898, entitled "MUTABLE PARAMETERS FOR MACHINE LEARNING MODELS DURING RUNTIME," filed May 31, 2019, which is hereby incorporated herein by reference in its entirety and made part of the present U.S. Utility patent application for all purposes.

TECHNICAL FIELD

The present description generally relates to providing a neural network model for execution on a target platform.

BACKGROUND

Software engineers and scientists have been using computer hardware for machine learning to make improvements across different industry applications including image classification, video analytics, speech recognition and natural language processing, etc. Notably, neural networks are being utilized more frequently to create systems that can perform different computing tasks based on training from sizable amounts of data.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Machine learning has seen a meteoric rise in popularity in recent years due to the availability of massive amounts of training data, and advances in more powerful and efficient computing hardware. One prevalent machine learning technique is utilizing a deep neural network to perform a set of machine learning tasks. For training a deep neural network, a common approach is utilizing a graphical processing unit (GPU), and also for executing the deep neural network on new input data post-training. However, in some instances when executing a given deep neural network, depending on the machine learning task, it may not be possible to update certain parameters for the network. For example, some types of parameter data are already included as part of a compiled binary of a neural network that is executed on a target device by a machine learning application. Further, in some runtime environments, a machine learning application may not have direct access to the neural network. Consequently, it may not be possible to update the parameter data in the neural network as it is running.

Implementations of the subject technology described herein improve the computing functionality of an electronic device by enabling parameters (e.g., weights) of a neural network to be updated while being executed by the electronic device without expending additional computing resources required when recompiling the neural network in order to update the parameters. Advantageously, the neural network can more quickly adapt to changing conditions (e.g., environmental) and perform machine learning tasks that are more responsive to such changing conditions. These benefits therefore are understood as improving the computing functionality of a given electronic device, such as an end user device which may generally have less computational resources available than, e.g., one or more cloud-based servers.

Figure 1:
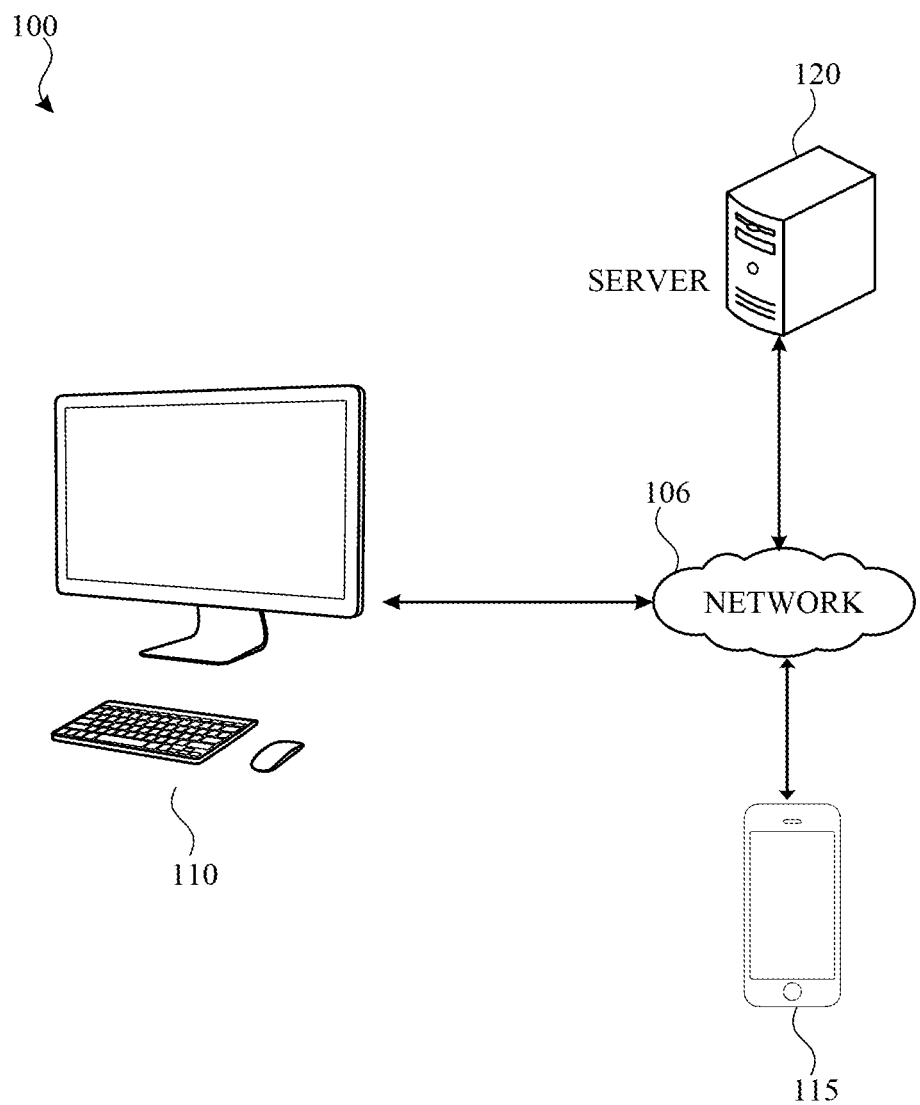
FIG. 1 illustrates an example network environment in accordance with one or more implementations.

FIG. 1 illustrates an example network environment 100 for in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, and a server 120. The network 106 may communicatively (directly or indirectly)

couple the electronic device 110 and/or the server 120, the electronic device 115 and/or the server 120, and/or electronic device 110 and/or the electronic device 115. In one or more implementations, the network 106 may be an interconnected network of devices that may include, or may be communicatively coupled to, the Internet. For explanatory purposes, the network environment 100 is illustrated in FIG. 1 as including an electronic device 110, an electronic device 115, and a server 120; however, the network environment 100 may include any number of electronic devices and any number of servers.

The electronic device 110 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 110 is depicted as a desktop computer. The electronic device 110 may be, and/or may include all or part of, the electronic system discussed below with respect to FIG. 8.

In one or more implementations, the electronic device 110 may provide a system for generating metadata to enable mutable parameters in a given neural network model. As mentioned herein, a mutable parameter refers to a parameter of a machine learning model that can be updated while executing the neural network model. In particular, the subject system may include a neural network compiler for compiling code corresponding to the neural network model. In an example, the subject system, using the compiled code, can create an executable software package for deployment on a target platform, such as the electronic device 115, with facilitation from the server 120. When executing the compiled code, the target platform can perform a given operation(s) of the neural network model.

The electronic device 115 may be, for example, a portable computing device such as a laptop computer, a smartphone, a peripheral device (e.g., a digital camera, headphones), a tablet device, a wearable device such as a watch, a band, and the like, or any electronic device. The electronic device may further include processors having different compute capabilities, including, for example, a CPU, a GPU, and/or a neural processor. In FIG. 1, by way of example, the electronic device 115 is depicted as a smartphone device. In one or more implementations, the electronic device 115 may be, and/or may include all or part of, the electronic system discussed below with respect to FIG. 8.

In one or more implementations, the server 120 deploys the compiled code included in an executable software package to a target device for execution. The electronic device 115, in an example, may be a target device for receiving the software package with the compiled neural network code and for executing the compiled code in a runtime environment of the electronic device 115. The electronic device 115 (or any electronic device that is a target device) includes a framework that is enabled to execute operations in the compiled code of the neural network. A framework can refer to a software environment that provides particular functionality as part of a larger software platform to facilitate development of software applications.

Figure 2:
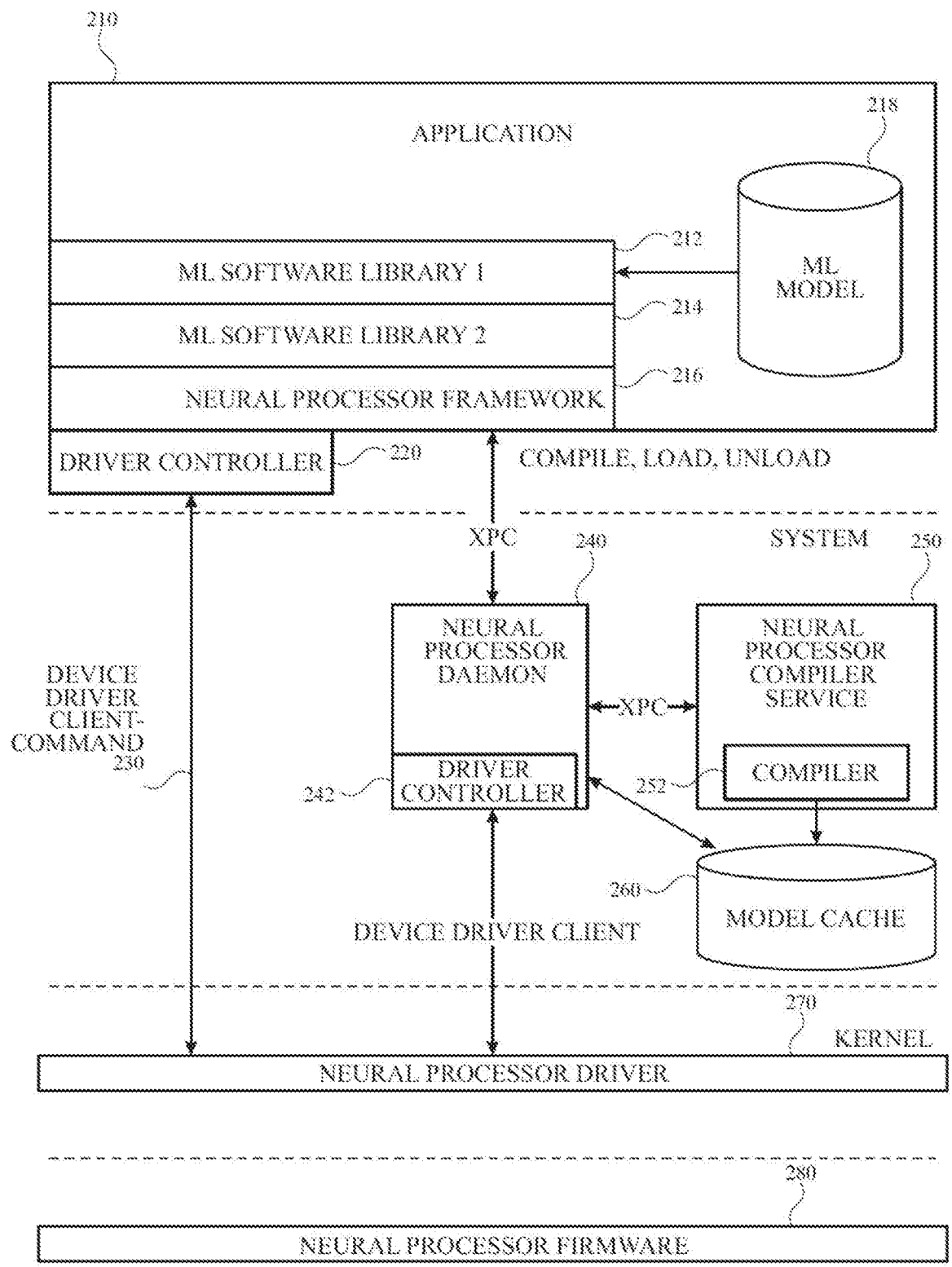
FIG. 2 illustrates an example software stack implemented on an electronic device for locally compiling source code and generating metadata for mutable parameters of a neural network model and loading the model in an application that executes on the electronic device in accordance with one or more implementations.

FIG. 2 illustrates an example software stack implemented on an electronic device (e.g., the electronic device 115) for locally compiling source code and generating metadata for mutable parameters of a neural network model and loading the model in an application that executes on the electronic device in accordance with one or more implementations. The software stack may include different layers corresponding to different address spaces in memory of the electronic device. In some implementations, the electronic device may include a neural network compiler on the device itself which enables the device to support compilation of source code for neural network models. In this manner, the device may load and execute the locally compiled neural network model without involving another device (e.g., the server 120 or the electronic device 110) to compile such source code. Although the electronic device 115 is mentioned, it is appreciated that the software stack illustrated in FIG. 2 may be implemented by any appropriate device that includes a neural processor to support execution of neural network models outside of a CPU and/or GPU.

In one or more implementations, the electronic device 115 may include one or more portions of the software stack utilized for running the neural network model, but may not include one or more portions of the software stack utilized for compiling the neural network model.

As illustrated, the software stack includes an application 210 in a first layer of the software stack. The application 210 may include components such as a first machine learning software library 212, a second machine learning software library 214, and a neural processor framework 216. In an implementation, the first machine learning software library 212 may be exposed for use by third parties (e.g., a developer writing code for the application 210) while the second machine learning software library 214 is not accessible by third parties and is utilized by internally by some components illustrated in the software stack. Below the first layer is a middle layer ("System") including a neural processor daemon 240, a neural processor compiler service 250, and a model cache 260. In an example, the neural processor daemon 240 is a secure background process which the neural processor framework 216 can communicate with to perform operations for compiling, loading and/or unloading a neural network model. As further shown, a neural processor driver 270 is in a layer corresponding to a kernel (e.g., the OS running on the electronic device 115) and below the neural processor driver 270 is a neural processor firmware 280. The neural processor driver 270, in an example, allows other software (e.g., the application 210 and/or the neural processor daemon 240) to communicate with neural processor firmware 280 which enables such software to control (e.g., via execution of commands) the neural processor included in the electronic device 115.

In an example, a user (e.g., developer and/or application 210) provides code and information for a neural network (NN) model with layers and weights (e.g., scale, bias, kernel weights, activation parameters), which may include weights and layers that are mutable during runtime. In an example, a weight can be assigned to a particular layer of the NN model. Further, one or more layers of the NN model include a bias value and a scale value (e.g., weights) that can be updated at runtime to modify the execution of a layer. In implementations described herein, only a particular type of layer in the neural network may include mutable parameters, such as a gain offset control (GOC) layer, while other layers in the neural network may include immutable parameters that are unable to be updated during runtime. However, a similar technique can be generalized to other types of layers, such as convolution layers, where the kernel weights can be mutated, or activation layers, where the activation parameters can also be mutated using similar mechanism.

The aforementioned code and information (e.g., including weights and layers) for the NN model is provided to the neural processor daemon 240 (e.g., a secure daemon), which in turns sends the code and information of the NN model with the weights to a compiler 252 provided by a neural processor compiler service 250. The neural processor compiler service 250 is discussed in more detail further below.

The compiler 252 generates a compiled binary of the NN model, and during compilation is configured to generate metadata that enables weights of the NN model to be updated during runtime, which is discussed in further detail herein. In an implementation, the NN model relates to a style transfer network that utilizes environment conditions and/or sensor information (e.g., camera, motion, etc.). As mentioned herein, a style transfer network refers to a machine learning network that provides software algorithms for manipulating, for example, digital images, or videos, to adopt the appearance or visual style of another image. The compiler 252 creates a mutable kernel data section in the binary to enable changing weights of the NN model during runtime by the driver component. The driver component may update respective mutable weights of the NN model during runtime based on a weight file provided by an application, and the metadata information generated at compilation time and embedded in the compiled network binary. In another example, the compiler 252 includes the weights (e.g., scale and/or bias parameters) in information that is separate (e.g., in a file) from the compiled binary. The compiler 252 generates metadata to enable an update of the weights during runtime by the neural processor driver 270. In one or more implementations, these technique(s) may be applied to another type of network (e.g., a network other than a style transfer network) that requires to be updated based on some environment parameters. For instance, the technique(s) may be used to personalize a network to the user private environment (e.g., a scene semantic network, where the application may detect certain objects such as chairs or tables, but be tuned to the user private environment).

By way of example, such a NN model as described above can be a convolutional neural network. Each convolutional layer of a given NN model can detect features in an input image by comparing image sub-regions to a set of kernels and determining similarities between sub-regions and kernels using at least a convolution operation. For example, each of the kernels can represents a feature that may be present in the image, and such kernels can represent image features as numerical values (e.g., as a matrix) and may be stored in a particular part of the compiled binary (e.g., a kernel data section). A kernel can be represented as a matrix with a same dimensions as a sub-region in one example.

After being compiled, the compiler 252 places the compiled binary of the NN model into model cache 260. Additionally, the compiler 252 sends a handle corresponding to the NN model to the neural processor daemon 240. As mentioned herein, a handle is a reference (e.g., pointer in memory) to the NN model that facilitates access to the NN model stored in model cache 260.

In an implementation, during runtime of the NN model, a client application such as the application 210 that is to execute the binary of the NN model can pass a weight file (e.g., with updated weight values) to the neural processor driver 270. However, because of the secure architecture of the system, the client application does not have access to the NN binary and only has a reference (e.g., handle) to the NN binary. The client application uses the handle to pass the new weight file to the neural processor driver, and receives the result of the machine learning tasks performed by the NN binary that uses the updated weights in the weight file. An example of a weight file is discussed further in FIG. 3.

The neural processor framework 216 may facilitate communication with the neural processor daemon 240 to invoke commands related to managing neural network models including at least compiling, loading and/or unloading neural network models. In an example, the neural processor daemon 240 may receive a notification that the application 210 has been installed on the electronic device. The neural processor daemon 240 can iterate through components of the application 210 (e.g., as included in the application bundle or package) to locate a neural network model as part of the application. Once located, the neural processor daemon 240 sends a command to the neural processor compiler service 250 to compile source code associated with the neural network model. As illustrated, the neural processor compiler service 250 includes the compiler 252 that compiles source code corresponding to the neural network model. The compiler 252 may store the compiled neural network model in a model cache 260 which may be stored in memory (e.g., RAM provided by the electronic device 115). In an implementation, the model cache 260 is stored in a memory address space (e.g., a system memory address space) separate from a memory address space of the application 210. The neural processor daemon 240 further includes a driver controller 242 to communicate directly (e.g., via a device driver client) with the neural processor driver 270, which is discussed in more detail below.

In an implementation, when the application 210 is executed (e.g., after being installed), the application 210 may load the compiled neural network model now stored in the model cache 260 and store the neural network model source into a ML model storage 218 in the memory address space of the application 210. The application may utilize at least one of the first ML software library 212 and the second ML software library 214 and/or the neural processor framework 216 to send a command to the neural processor daemon 240 for loading the cached neural network model into the memory address space of the neural processor driver (e.g., by storing in the ML model storage 218). After being loaded into the memory address space, the application 210 can invoke commands using the loaded neural network model in various ways as discussed herein.

However, in another implementation, the application 210 may not be allowed to store the cached neural network model into the ML model storage 218, and the neural network model is to be accessed using the handle described above. For certain applications, security is more strict and the application 210 is only allowed access to the neural network model via the provided handle to the model (e.g., for updating the parameters of the neural network model during runtime using the weight file).

In an example, the application 210 includes a driver controller 220 that communicates with the neural processor driver 270. During execution, the application 210 may execute a inference command for the already loaded compiled neural network model in the memory space of the neural processor driver. The neural processor driver 270 enables the application 210 to send commands indirectly to the neural processor firmware 280 for execution on the neural processor. For example, the application 210 utilizes the driver controller 220 to send a command for making a style transfer using the compiled neural network model already loaded in the memory space of the neural processor driver (e.g., as shown in this example as a predict command 230 using a device driver client). In this regard, the driver controller 220 sends the predict command 230 to the neural processor driver 270, which in turn sends the command to the neural processor firmware 280 for executing. The results of executing the predict command 230 are returned by the neural processor driver 270 to the application 210.

Alternatively, the application 210 can invoke a command, such as a style transfer, using the loaded neural network model through communication with the neural processor daemon 240. In this example, the neural processor daemon 240 sends the command (e.g., using a device driver client invoked by the driver controller 242) to the neural processor driver 270, which then communicates with the neural processor firmware 280 that eventually runs the command on the neural processor. The results of the command are sent back to the neural processor daemon 240 from the neural processor driver 270. The neural processor daemon 240 then sends the results of the command to the application 210.

Recently, specialized (e.g., dedicated) hardware has been developed that is optimized for performing particular operations from a given NN. A given electronic device may include a neural processor, which can be implemented as circuitry that performs various machine learning operations based on computations including multiplication, adding and accumulation. Such computations may be arranged to perform, for example, convolution of input data. A neural processor, in an example, is specifically configured to perform machine learning algorithms, typically by operating on predictive models such as NNs. In one or more implementations, an electronic device may include a neural processor in addition to a CPU and/or a GPU.

A CPU, as discussed herein, can refer to a main processor in a given electronic device that performs operations for basic arithmetic, logical, control and input/output operations specified by the instructions of a computer program or application, including some operations for neural network models. A GPU, as discussed herein, can refer to a specialized electronic circuit designed to perform operations for rendering graphics, which is also being utilized in many instances to process computational workloads for machine learning operations (e.g., as specified by instructions of a computer program or application). The CPU, GPU, and neural processor may each have different computational specifications and capabilities depending on their respective implementations where each of the aforementioned components can provide varying degrees of performance for certain operations in comparison with the other components.

As discussed herein, a convolutional neural network refers to a particular type of neural network, but uses different types of layers made up of nodes existing in three dimensions where the dimensions may change between layers. In a convolutional neural network, a node in a layer may only be connected to a subset of the nodes in a previous layer. The final output layer may be fully connected and be sized according to the number of classifiers. As referred to herein, a fully connected layer is where each node of that layer receives input from each node of a previous layer. A convolutional neural network model may include various combinations, and in some instances, multiples of each, and orders of the following types of layers: the input layer, convolutional layers, pooling layers, rectified linear unit layers (ReLU), and fully connected layers. Part of the operations performed by a convolutional neural network includes taking a set of filters (or kernels) that are iterated over input data based on one or more parameters. In an example, the depth of a convolutional layer may equal the number of filters used. It is appreciated that the sizes of the different volumes at each layer may be mathematically determined given the hyperparameters of a convolutional neural network.

Figure 3:
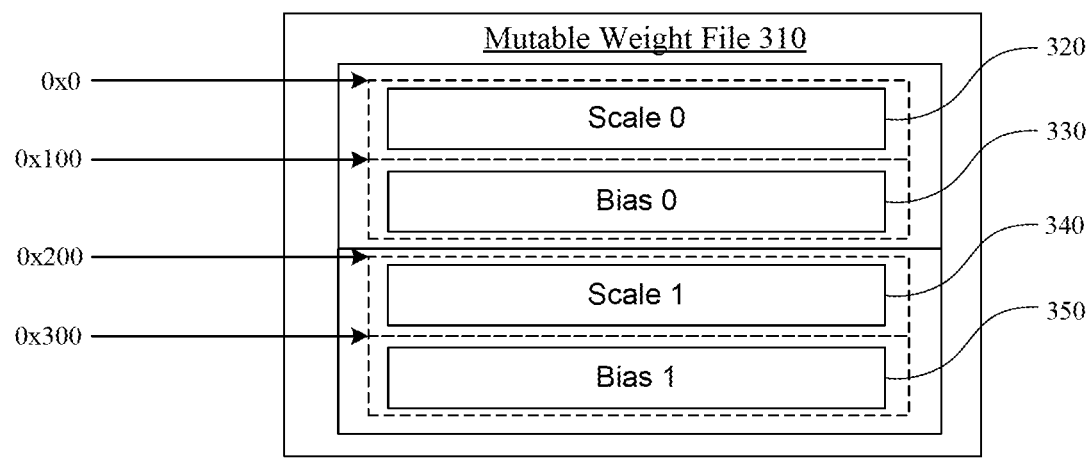
FIG. 3 illustrates an example structures of a mutable weight file provided by a user or application for updating mutable weights of a neural network model in accordance with one or more implementations.

FIG. 3 illustrates an example structures of a mutable weight file 310 provided by a user or application for updating mutable weights of a neural network model in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the mutable weight file 310 includes a set of weights corresponding to scale value 320, bias value 330, scale value 340, and bias value 350. In an implementation, the mutable weight file 310 includes information that is in a format provided by a given client but is not compatible with the structure of the compiled binary corresponding to the neural network model. For instance, the set of weights may include data in a layout that has contiguous addresses for each of the aforementioned scale and bias values. However, in an example, such contiguous addresses for the mutable weight file 310 does not provide the neural processor driver 270 information regarding the layout of such information in the compiled binary during runtime in order to be able to update the weights in the compiled binary. In the compiled binary, mutable parameters may be located in different portions of the binary (e.g., at different address offsets) that are different from the addresses of the corresponding parameters in the mutable weight file 310.

In an implementation, a respective weight file is provided for each operation, from a given neural network model, that has mutable parameters.

In an implementation, the compiler 252 generates metadata to enable updating the weights during runtime by the neural processor driver 270. Such metadata includes: 1) information about the layers that are mutable and can be updated, 2) information about transformations performed by the compiler 252 to the mutable layers during compile time in order to generate a compiled binary that is compatible with the requirements of hardware of the target device to enable the hardware to execute the NN. Such metadata is included with the compiled binary of the neural network, and in an implementation, the metadata is stored in a part of the binary (e.g., a particular section of the binary without specific security protections) that is accessible by the neural processor driver 270 during runtime. Moreover, the metadata information can contain header information, listing procedures (described further herein) that can be updated and including information of an expected size for the weights data (e.g., in one or more weight files) provided by the client, which enables the neural processor driver 270 to verify data provided by the client at runtime.

During compilation, the compiler 252 performs several transformations the neural network model including, but not limited to: 1) fusing scale and bias operations; 2) fusing a scale and bias layer with another scale and bias layer; 3) other transformations including flattening a layer (e.g., converting a tensor to a single dimension that is forwarded to another layer). In an implementation, gain offset control (GOC) layers include mutable scale and/or bias parameters that can be updated during runtime. The compiler 252 generates information (e.g., metadata) that is sufficient to enable the end result to be reconstructed based on the original weights that the client will provide; e.g., client or application provides two values for two respective scale and bias layers (e.g., similar to the mutable weight file 310), and the metadata should include sufficient information to reconstruct the end result even when those 2 layers have been fused (e.g., combined) as part of the compilation process.

Further, the compiler 252 generates information (e.g., additional metadata) regarding specific data that is not mutable within the neural network model (e.g., a layer with a scaler scale and scalar bias may not be mutable; scale and bias shift are not mutable in an implementation).

Additionally, the compiler 252 generates rasterization information to comply with hardware requirements of a target device that is to execute the compiled neural network. For example, such rasterization information includes: 1) information for offsets into the mutable kernel data section of compiled binary; 2) information for alignment of data (e.g., layout) to be compatible with the hardware; and 3) information for where respective amounts of data are going into the mutable kernel data section.

An example of the aforementioned metadata generated by the compiler 252 is described below in connection with FIG. 4.

Figure 4:
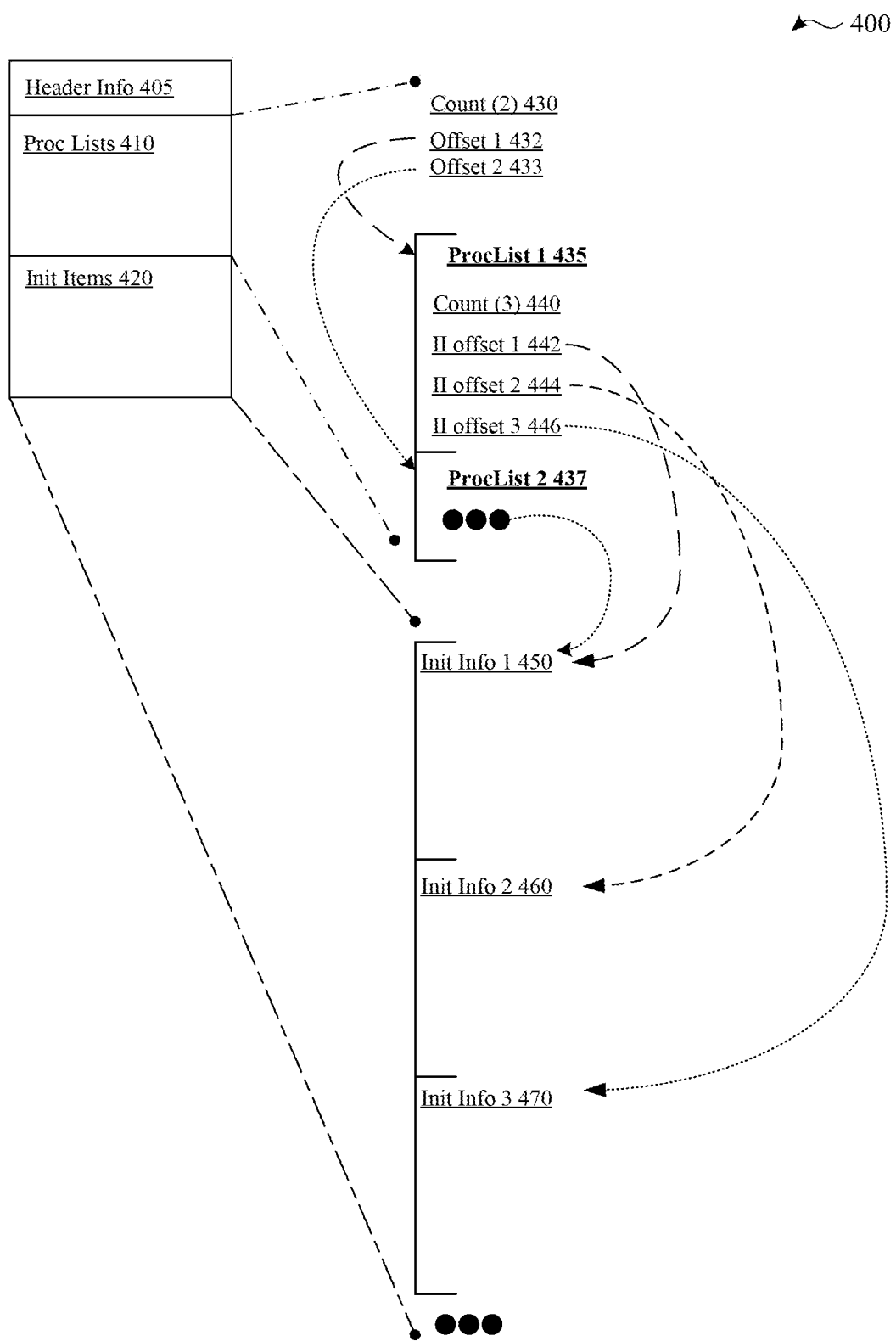
FIG. 4 illustrates an example structure of a metadata section generated by the compiler for including as part of a compiled binary of a neural network model to facilitate updating mutable weights of the neural network model during runtime in accordance with one or more implementations.

FIG. 4 illustrates an example structure of a metadata section 400 generated by the compiler 252 for including as part of a compiled binary of a neural network model to facilitate updating mutable weights of the neural network model during runtime in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As mentioned herein, the term "procedure" refers to a set of operations from a given neural network model in which the set of operations can come from a single layer of the neural network model or from multiple layers of the neural network model. In an example, each operation within the procedure includes a separate mutable weight file when the operation corresponds to a layer with mutable parameters such as a mutable GOC layer as discussed above. In particular, mutable scale and bias data can be stored in a separate weight file, at offsets specified by the metadata described further below. It is appreciated that the metadata described below can include one or more procedures for the neural network model.

At runtime, as an example, the user or application provides a respective mutable weight file for each operation in a given procedure. However, in an implementation, the neural processor driver 270 requires information to match each weight file with a specific operation in the procedure. This information is provided by the metadata described herein.

In implementation, procedures, including respective operations performed by a given neural network model, are uniquely identified by a respective symbol (e.g., proc0, proc1, etc.) and/or an index in a data structure such as a list. Similarly, each operation within each procedure can be uniquely identified by a particular symbol (e.g., op0, op1, etc.) or by a respective index in an array.

The metadata section 400 starts with header information which includes a version number corresponding to a version of the metadata layout, and information indicating hardware architecture type, for future reference to determine whether the metadata section 400 is compatible with particular hardware. Header information 405 can include, in an implementation, the following information:
  version
  cpu_type
  cpu_subtype
  procedure_count In an implementation, the metadata section 400 includes information for an offset of each "ProcList" section for a respective procedure (discussed further below) even though some procedures may not be mutable. For a given procedure that is not mutable, the offset is 0 and includes no-ops in an implementation. In an example, the no-ops refer to information that indicates no corresponding operation is associated with the procedure that is not mutable.

Further, the metadata section 400 includes information for "InitInfo" which includes information for a set of transformations and rasterization data that applies to a set of one or two scale/bias vectors from a mutable weight file that is provided at runtime by the client (e.g., the application 210) and/or the neural processor driver 270.

As illustrated in FIG. 4, lists 410 ("ProcLists") includes a count 430 indicating a number of respective ProcList sections. In particular, each ProcList section in the metadata section 400 includes information for a list of offsets for each of the aforementioned "InitInfo" (e.g., corresponding to information for a set of transformations and rasterization data). In an example, each ProcList section can correspond to a particular procedure associated with a particular procedure identifier. When a given procedure with a particular identifier (e.g., proc_id) is executed, all the corresponding "InitInfo" data is processed and used to patch/update the runtime copy of the mutable kernel data section before running the procedure.

In an implementation, the lists 410 ("ProcLists") can include information in the following format:
  Count of a number of respective ProcList sections
  Array of (N) ProcList section offsets
    section offset of Nth ProcList
  Array of ProcList sections
  Count of InitInfo section offsets for this ProcList
  Array of (N) InitInfo section offsets
    section offset of Nth InitInfo In the example of FIG. 4, the lists 410 includes a count 430 indicating a number of ProcList sections (e.g., 2) and an offset value 434 and an offset value 433 for each of the ProcList sections. The offset value 434 corresponds to a position of a ProcList section 435, and the offset value 433 corresponds to a position of a ProcList section 437. As illustrated in FIG. 4, the ProcList section 435 includes a count 440 indicating a number of InitInfo sections (e.g., 3), an offset value 442, an offset value 444, and an offset value 446 corresponding to respective InitInfo Sections. For example, the offset value 442 corresponds to a position of InitInfo section 450, the offset value 444 corresponds to a position of InitInfo section 460, and the offset value 446 corresponds to InitInfo section 470.

As further shown, items 420 ("Init Items") include information for each "InitInfo" section included in the metadata section 400. For example, the items 420 include InitInfo section 450, InitInfo section 460, and InitInfo section 470. As mentioned above, a respective offset can be included in a ProcList section that corresponds to each InitInfo section. Each of InitInfo section in the items 420 can include the following information for each InitInfo section:
  Count of a number of InitInfo sections
  Array of InitInfo sections
    Boolean HasScale flag
    Boolean HasBias flag
    Boolean HasWeight flag
    Boolean HasActivation flag
    Optional: Scale Vector FileInfo (if HasScale==1)
    Optional: Bias Vector FileInfo (if HasBias==1)

Optional: Weight FileInfo (if HasWeight==1)
Optional: Activation FileInfo (if HasActivation==1)
Transformations for this InitInfo section
  Count of Transformations
  Sequential List of (N) Transformations (each is variable size)
Items for this InitInfo section
  Count of Items
  Sequential List of (N) Items (each variable size)
    Transformation Information for Item
    Rasterization Information for Item In an example, the "Items for this InitInfo section" includes information for values for scale and/or bias parameters. The "Count of Items" information refers to a number of scale and/or bias parameters. The "Sequential List of (N) Items" information refers to information for each of the parameters including respective transformation information and rasterization information. In an example, the Sequential List of (N) Items" information can include N instances of respective transformation information and rasterization information.

Figure 5:
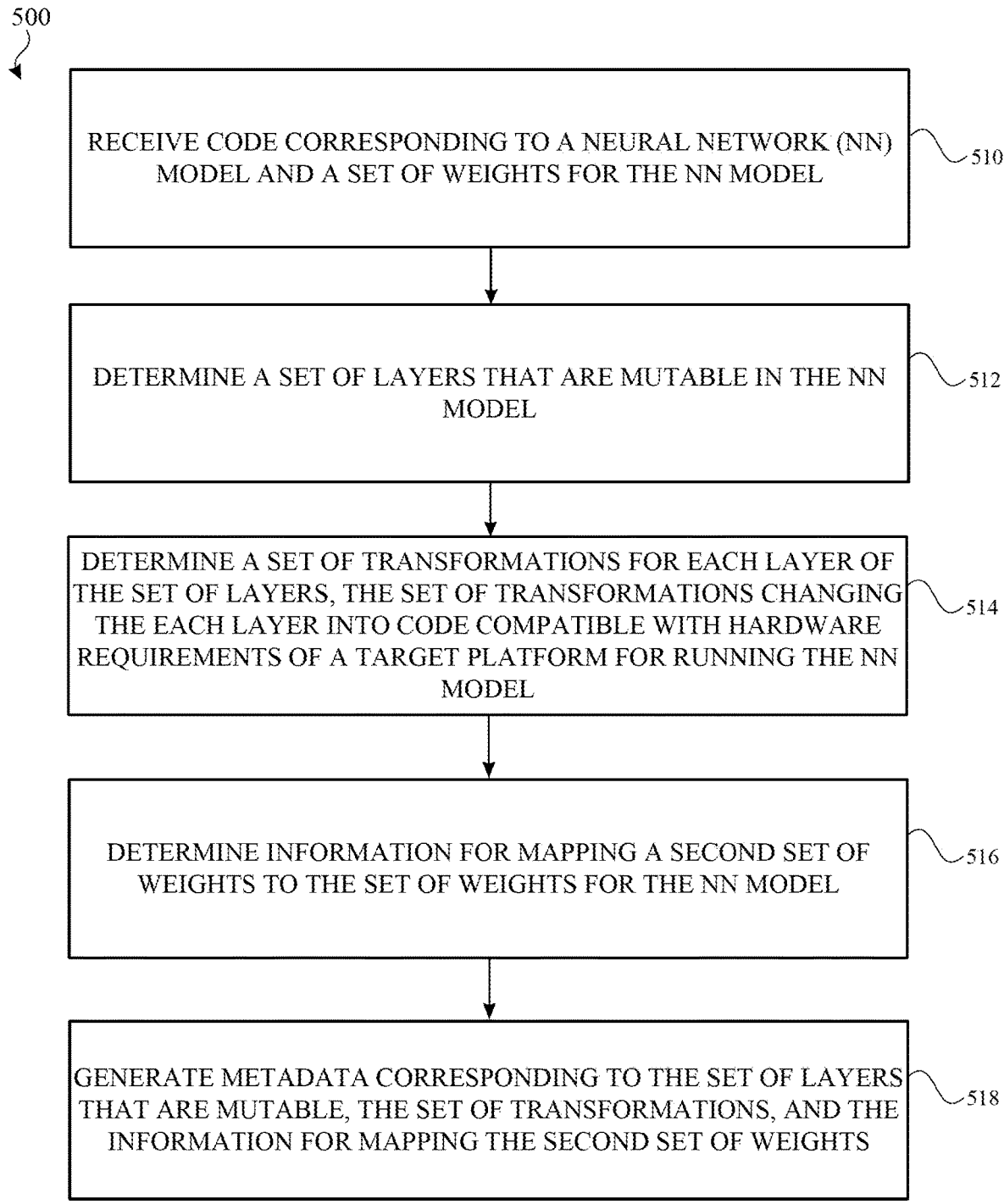
FIG. 5 illustrates a flow diagram of an example process for generating metadata for a neural network for updating parameters during runtime in accordance with one or more implementations.

FIG. 5 illustrates a flow diagram of an example process 500 for generating metadata for a neural network for updating parameters during runtime in accordance with one or more implementations. For explanatory purposes, the process 500 is primarily described herein with reference to components of the software architecture of FIG. 2, which may be executed by one or more processors of the electronic device 115 of FIG. 1. However, the process 500 is not limited to the electronic device 115, and one or more blocks (or operations) of the process 500 may be performed by one or more other components of other suitable devices, such as by the electronic device 110. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The compiler 252 receives code corresponding to a neural network (NN) model and a set of weights for the NN model (510). The compiler 252 determines a set of layers that are mutable in the NN model (512). The compiler 252 determines a set of transformations for each layer of the set of layers, the set of transformations changing each layer into code compatible with hardware requirements of a target platform for running the NN model (514). Generating the metadata may include information corresponding to the set of transformations (e.g., and rasterization information, matching the hardware requirements).

At operation 516, the compiler 252 determines information for mapping a second set of weights (e.g., provided by the application client at execution time) to the set of weights for the NN model (e.g., in the compiled binary). In an example, mapping the second set of weights involves mapping a logical representation of the weights (e.g., provided by a first format of a given weight file) to a hardware representation of the weights as required by the hardware of a target device. Such mapping may involve information corresponding to offsets and/or alignments for the weights that the hardware requires (e.g., a layout of the data in memory of the hardware) in order to access the weights from the binary. The first format can refer to the layout of data provided in a weight file e.g., as described before in FIG. 3 which includes contiguous addresses for the weights. In order for the weights from the weight file to be compatible with the hardware, particular offsets and alignment information (e.g., the mapping) are determined by the compiler 252 which are included in metadata generated by the compiler 252 and also discussed in FIG. 4.

Further, the compiler 252 generates metadata corresponding to the set of layers that are mutable, the set of transformations, and the information for mapping the second set of weights (518).

Figure 6:
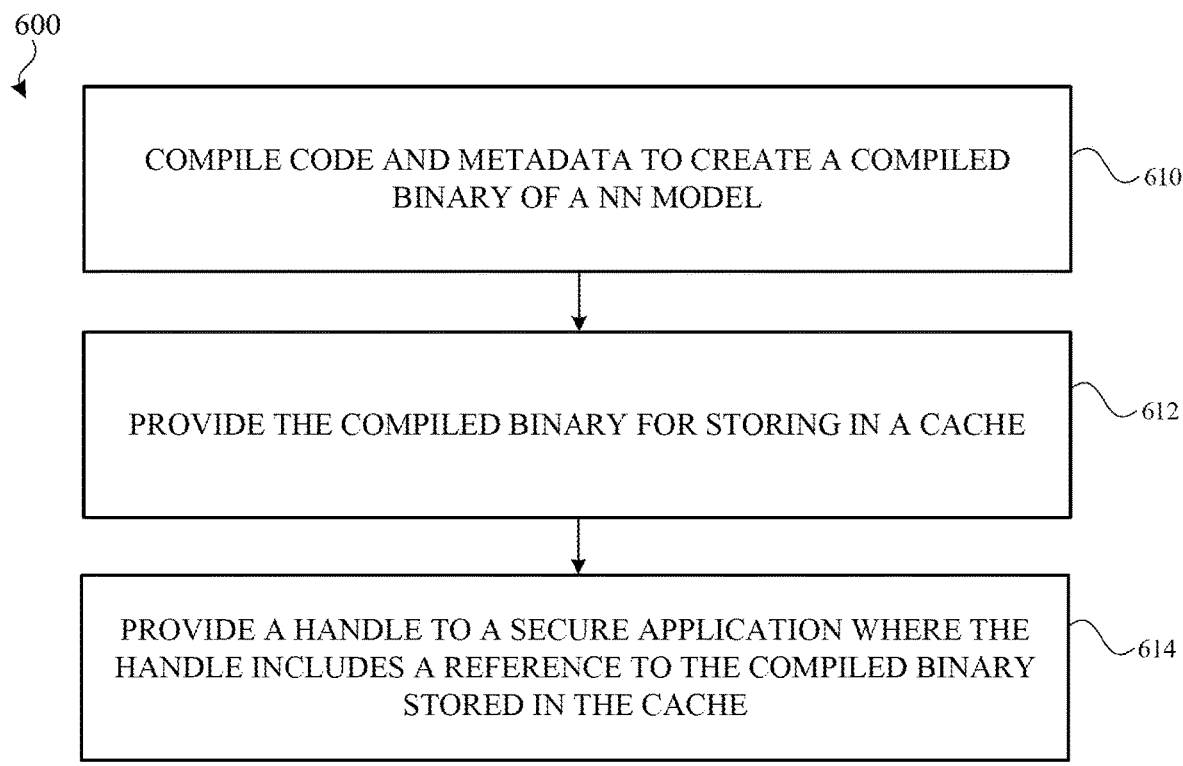
FIG. 6 illustrates a flow diagram of an example process for compiling a neural network with the generated metadata described in FIG. 5 in accordance with one or more implementations.

FIG. 6 illustrates a flow diagram of an example process 600 for compiling a neural network with the generated metadata described in FIG. 5 in accordance with one or more implementations. For explanatory purposes, the process 600 is primarily described herein with reference to components of the software architecture of FIG. 2, which may be executed by one or more processors of the electronic device 115 of FIG. 1. However, the process 600 is not limited to the electronic device 115, and one or more blocks (or operations) of the process 600 may be performed by one or more other components of other suitable devices, such as by the electronic device 110. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The compiler 252 compiles code and generated metadata to create a compiled binary of the NN model (610). The compiler 252 provides the compiled binary to the neural processor compiler service for storing in a cache (612). Further, the neural processor compiler service provides a handle to a secure application, where the handle includes a reference to the compiled binary stored in the cache (614).

Figure 7:
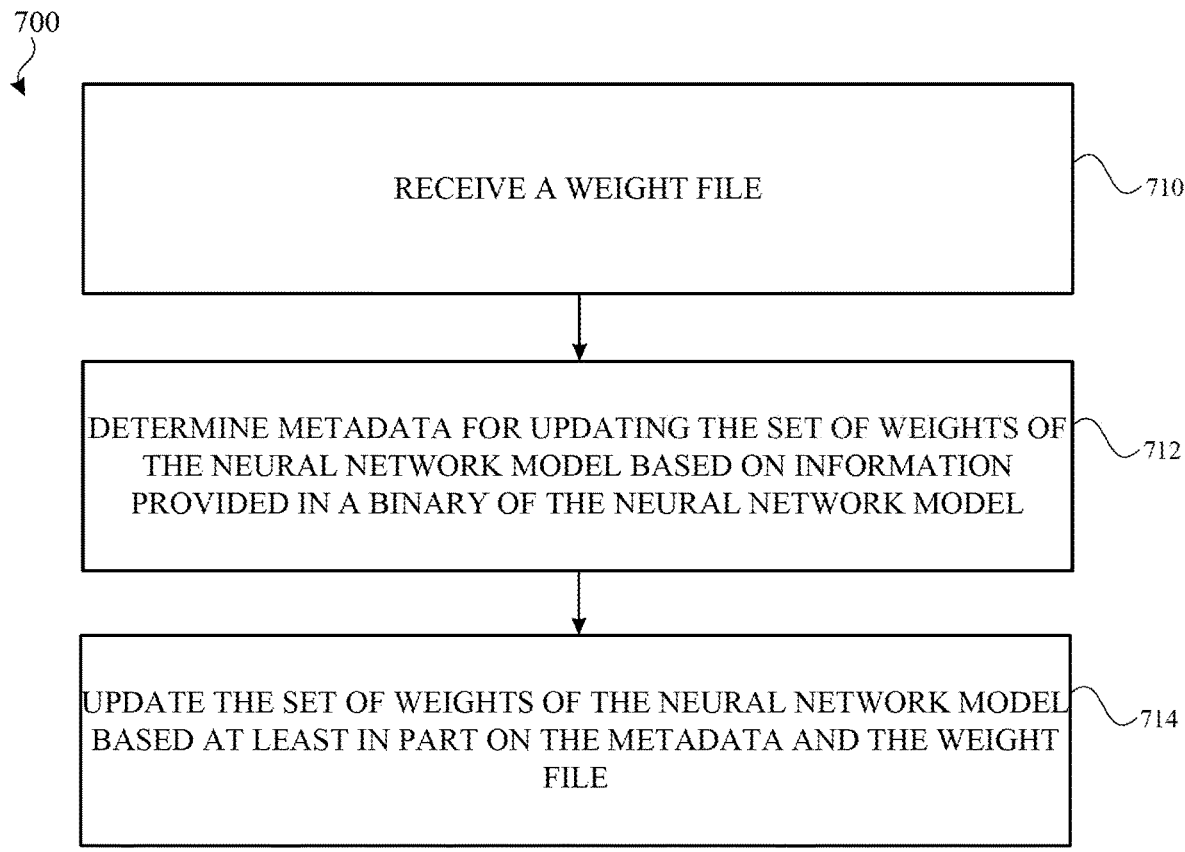
FIG. 7 illustrates a flow diagram of an example process 700 for updating weights of a neural network model that is currently executing in accordance with one or more implementations.

FIG. 7 illustrates a flow diagram of an example process 700 for updating weights of a neural network model that is currently executing in accordance with one or more implementations. For explanatory purposes, the process 700 is primarily described herein with reference to components of the software architecture of FIG. 2, which may be executed by one or more processors of the electronic device 115 of FIG. 1. However, the process 700 is not limited to the electronic device 115, and one or more blocks (or operations) of the process 700 may be performed by one or more other components of other suitable devices, such as by the electronic device 110. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The neural processor driver 270 receives a weight file (710) with an inference request from the application client. In an example, the weight file includes information corresponding to a set of values for updating a set of weights of a neural network model that is currently executing on an electronic device (e.g., the electronic device 115).

The neural processor driver 270 determines metadata for updating the set of weights of the neural network model based on information provided in a binary of the neural network model (712). In an example, the metadata includes the mapping corresponding to offsets and alignments in order for weights from the weight file to be compatible with hardware provided by the electronic device.

The neural processor driver 270 updates the set of weights of the neural network model based at least in part on the metadata and the weight file (714). In an example, the weights may be updated by applying the numerical transforms and rasterization mappings in the metadata to the weights in the weight file.

Figure 8:
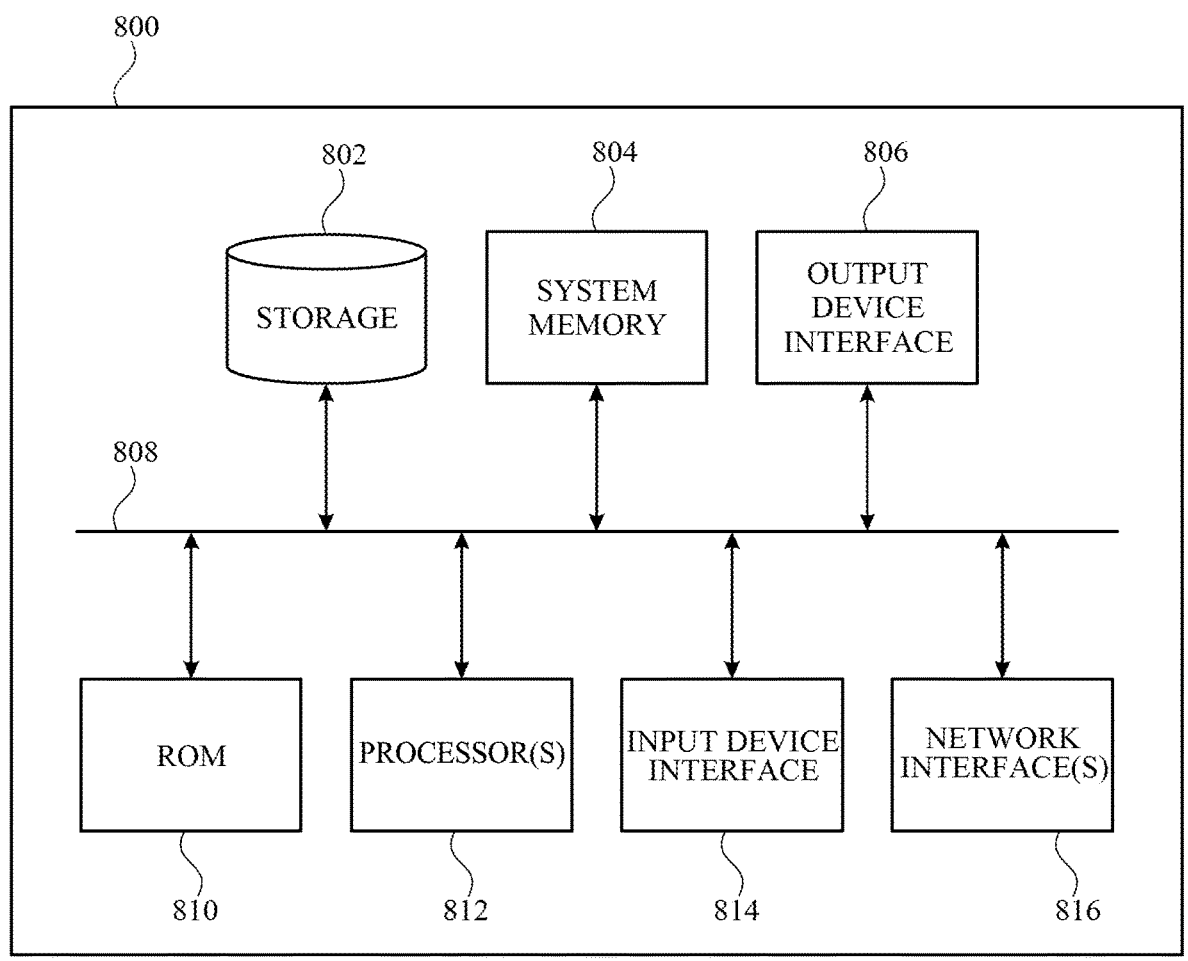
FIG. 8 illustrates an electronic system with which one or more implementations of the subject technology may be implemented.

FIG. 8 illustrates an electronic system 800 with which one or more implementations of the subject technology may be implemented. The electronic system 800 can be, and/or can be a part of, the electronic device 110, the electronic device 115, and/or the server 120 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the electronic device 115 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

One aspect of the present technology may include the gathering and use of data available from specific and legitimate sources for performing machine learning operations such as those provided in applications that utilize machine learning models (e.g., neural networks) to provide particular functionality that may be useful for users. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to perform machine learning tasks (e.g., predictions, classifications, determining similarity, detecting anomalies, etc.) that are useful to users. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   receiving code corresponding to a neural network (NN) model and a set of weights for the NN model;
   determining a set of layers that are mutable in the NN model;
   determining information for mapping a second set of weights to the set of weights for the NN model;
   generating metadata corresponding to the set of layers that are mutable, and the information for mapping the second set of weights to the set of weights for the NN model, wherein the generated metadata enables updating the set of layers that are mutable during execution of the NN mode; and
   compile the code and the generated metadata to create a compiled binary of the NN model.

2. The method of claim 1, further comprising
   providing the compiled binary for storing in a cache; and
   providing a handle to a secure application, wherein the handle includes a reference to the compiled binary stored in the cache.

3. The method of claim 1, wherein the code further includes parameters for bias values and scale values corresponding to the weights for the NN model.

4. The method of claim 1, wherein the second set of weights is in a first format that corresponds to a file, the file including the second set of weights with a first set of addresses that are different than a second set of addresses for the set of weights in the NN model.

5. The method of claim 1, further comprising:
   determining a set of transformations for each layer of the set of layers, the set of transformations changing each layer into code compatible with hardware requirements of a target platform for running the NN model, wherein generating the metadata includes information corresponding to the set of transformations.

6. The method of claim 5, wherein the set of transformations include fusing scale and bias operations, fusing a scale and bias layer with another scale and bias layer, or flattening a layer.

7. The method of claim 1, wherein the metadata includes information corresponding to offsets of a set of operations performed by a respective mutable layer of the NN model.

8. The method of claim 1, wherein the metadata includes information for an offset into a mutable kernel data section of a compiled binary of the NN network, the mutable kernel section including respective weights that are mutable during execution of the NN network.

9. The method of claim 8, wherein a driver component updates respective mutable weights of the NN network during runtime based on a weight file provided by an application.

10. The method of claim 9, wherein the weight file includes a set of vectors that include data corresponding to the respective mutable weights.

11. The method of claim 1, further comprising:
compiling the code and the generated metadata to create a compiled binary of the NN model.

12. A system comprising;
a processor;
a memory device containing instructions, which when executed by the processor cause the processor to:
receive code corresponding to a neural network (NN) model and a set of weights for the NN model;
determine a set of layers that are mutable in the NN model;
determine information for mapping a second set of weights to the set of weights for the NN model; and
generate metadata corresponding to the set of layers that are mutable, and the information for mapping the second set of weights to the set of weights for the NN model, wherein the generated metadata enables updating the set of layers that are mutable during execution of the NN model; and
compile the code and the generated metadata to create a compiled binary of the NN model.

13. The system of claim 12, wherein the memory device contains further instructions, which when executed by the processor further cause the processor to:
provide the compiled binary for storing in a cache; and
provide a handle to a secure application, wherein the handle includes a reference to the compiled binary stored in the cache.

14. The system of claim 12, wherein the code further includes parameters for bias values, scale values, weights values, activations parameters corresponding to the NN model.

15. The system of claim 12, wherein the second set of weights is in a first format that corresponds to a file, the file including the second set of weights with a first set of addresses that are different than a second set of addresses for the set of weights in the NN model.

16. The system of claim 12, wherein the memory device contains further instructions, which when executed by the processor further cause the processor to:
determine a set of transformations for each layer of the set of layers, the set of transformations changing each layer into code compatible with hardware requirements of a target platform for running the NN model, wherein generating the metadata includes information corresponding to the set of transformations.

17. The system of claim 16, wherein the set of transformations include fusing scale and bias operations, fusing a scale and bias layer with another scale and bias layer, or flattening a layer.

18. The system of claim 12, wherein the metadata includes information corresponding to offsets of set of operations performed by a respective mutable layer of the NN model.

19. The system of claim 18, wherein the metadata includes information for an offset into a mutable kernel data section of a compiled binary of the NN network, the mutable kernel section including respective weights, scale, bias or activation parameters that are mutable during execution of the NN network.

20. The system of claim 19, wherein a driver component updates respective mutable weights of the NN network during runtime based on a weight file provided by an application.

21. A non-transitory computer-readable medium comprising instructions, which when executed by a computing device, cause the computing device to perform operations comprising:
receiving, by a driver provided by the computing device, a weight file, the weight file including information corresponding to a set of values for updating a set of weights of a neural network model, the neural network model currently executing on the computing device;
determining, by the driver, metadata for updating the set of weights of the neural network model based on information provided in a binary of the neural network model; and
updating, by the driver and while the neural network model is currently executing on the computing device, the set of weights of the neural network model based at least in part on the metadata and the weight file.

* * * * *